United States Patent
Park

(10) Patent No.: US 6,434,126 B1
(45) Date of Patent: Aug. 13, 2002

(54) METHOD OF PERFORMING SERVICE IN MOBILE COMMUNICATION INTELLIGENT NETWORK

(75) Inventor: Hyung Soo Park, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/223,736

(22) Filed: Dec. 31, 1998

(30) Foreign Application Priority Data

Dec. 12, 1998 (KR) .............................. 98-54628

(51) Int. Cl.[7] .................................................. H04Q 7/00
(52) U.S. Cl. ...................... 370/328; 455/433; 455/435; 455/445
(58) Field of Search .................. 370/328, 329, 370/338, 340, 341, 410; 379/207.02, 221.08, 221.09, 221.1, 221.11, 229 R–241; 455/415, 455, 405, 433, 461, 435, 406, 445, 500

(56) References Cited

U.S. PATENT DOCUMENTS

| | | | | |
|---|---|---|---|---|
| 5,504,804 A | * | 4/1996 | Widmark et al. ............. | 379/63 |
| 5,742,905 A | * | 4/1998 | Pepe et al. .................... | 455/461 |
| 6,085,101 A | * | 7/2000 | Jain et al. ..................... | 455/500 |
| 6,115,600 A | * | 9/2000 | Tuohino et al. ............... | 455/405 |
| 6,128,503 A | * | 10/2000 | Granberg et al. ............. | 455/461 |
| 6,181,927 B1 | * | 1/2001 | Welling, Jr. et al. .......... | 455/414 |
| 6,219,551 B1 | * | 4/2001 | Hentila et al. ................ | 455/445 |
| 6,253,072 B1 | * | 6/2001 | Verdonk ........................ | 455/406 |
| 6,324,396 B1 | * | 11/2001 | Vasa et al. .................... | 455/415 |

* cited by examiner

Primary Examiner—Ricky Ngo
Assistant Examiner—Phuc Tran
(74) Attorney, Agent, or Firm—Fleshner & Kim, LLP

(57) ABSTRACT

A method of performing a service in a mobile communication intelligent network is disclosed. The method of performing the service includes storing an identification of audio service subscribers and an identification of anticipated originating subscribers in a service control point of the network. When an originating mobile station requests a call and a terminating mobile station responds to the call, an audio service is requested through a terminating mobile switching center. In response to the request, the identification of the originating mobile station stored in the service control point and an announcement request signal are sent to an intelligent peripheral associated with the terminating mobile terminal, and the terminating mobile switching center is connected with the intelligent peripheral. The identification of the originating mobile station is thus audibly announced from said intelligent peripheral to the terminating mobile station.

42 Claims, 14 Drawing Sheets

FIG.3

| SRFDirective INVOKE Parameters | | | Timer:SRFDT |
|---|---|---|---|
| Field | Value | Type | |
| Identifier | SET[NATIONAL 18] | M | |
| Length | variable octets | M | |
| Contents | | | |
| | AnnoucementList | O | |
| | DigitCollectionControl | O | |
| | ExecuteScript | O | |
| | Display Text | O | |

FIG.5

| Tanswer execution parameters | | Timer:TAT |
|---|---|---|
| field | value | type |
| identifier | SET[NATIONAL_18] | M |
| length | variable octad | M |
| Contens | | |
| BillingID(Invoking) | | M |
| MSCID | | M |
| TransactionCapability | | M |
| Triggertype | | M |
| WinCapability | | O |
| CallingPartyNumberDigits1 | | O |
| CallingPartyNumberDigits2 | | O |
| Calling Party Subaddress | | O |
| ElectronicSeriaNumber | | O |
| GroupInformation | | O |
| LegInformation | | O |
| LocationAreaID | | O |
| MobileDirectoryNumber | | O |
| MobileIdentificationNumber | | O |
| MSCIdentificationNumber | | O |
| OneTimeFeatherIndicator | | O |
| PilotBillingID | | O |
| PilotNumber | | O |
| PreferredLanguageIndicator | | O |
| RedirectingNumberDigits | | O |
| RedirectingSubaddress | | O |
| RedirectionReason | | O |
| ServingCellID | | O |
| SystemMyTypeCode | | O |
| TerminationAccessType | | O |

M : Manulatory
O : Optional

FIG.6

| Tanswer return result parameters | | |
|---|---|---|
| Field | Value | Type |
| identifier | SET[NATIONAL 18] | M |
| length | variable octad | M |
| Contens | | |
| AccessDeniedReason | | O |
| ActionCode | | O |
| ActionCodeList | | O |
| AnnouncementList | | O |
| CallingPartyNumberString1 | | O |
| CallingPartyNumberString2 | | O |
| CarrierDigits | | O |
| DisplayText | | O |
| DMH_AccountCodeDigits | | O |
| DMH_AlternateBillingDigits | | O |
| DMH_BillingDigits | | O |
| DMH_RendirectionIndicator | | O |
| GroupInformation | | O |
| OneTimeFeatureIndicator | | O |
| PilotNumber | | O |
| RedirectingNumberDigits | | O |
| ResumePIC | | O |
| RoutingDigits | | O |
| TerminationList | | O |
| TerminationTriggers | | O |
| TriggerAddressList | | O |

M : Manulatory
O : Optional

FIG.7

| Trigger detection point | Trigger type |
|---|---|
| Facility_Selected_and_Available | Terminating_Resource_Available |
| T_Answer | T_Answer |
| T_Busy | T_Busy |
| | T_No_Page_Response |
| | T_Unavailable |
| | T_Unroutable |
| T_No_Answer | T_No_Answer |

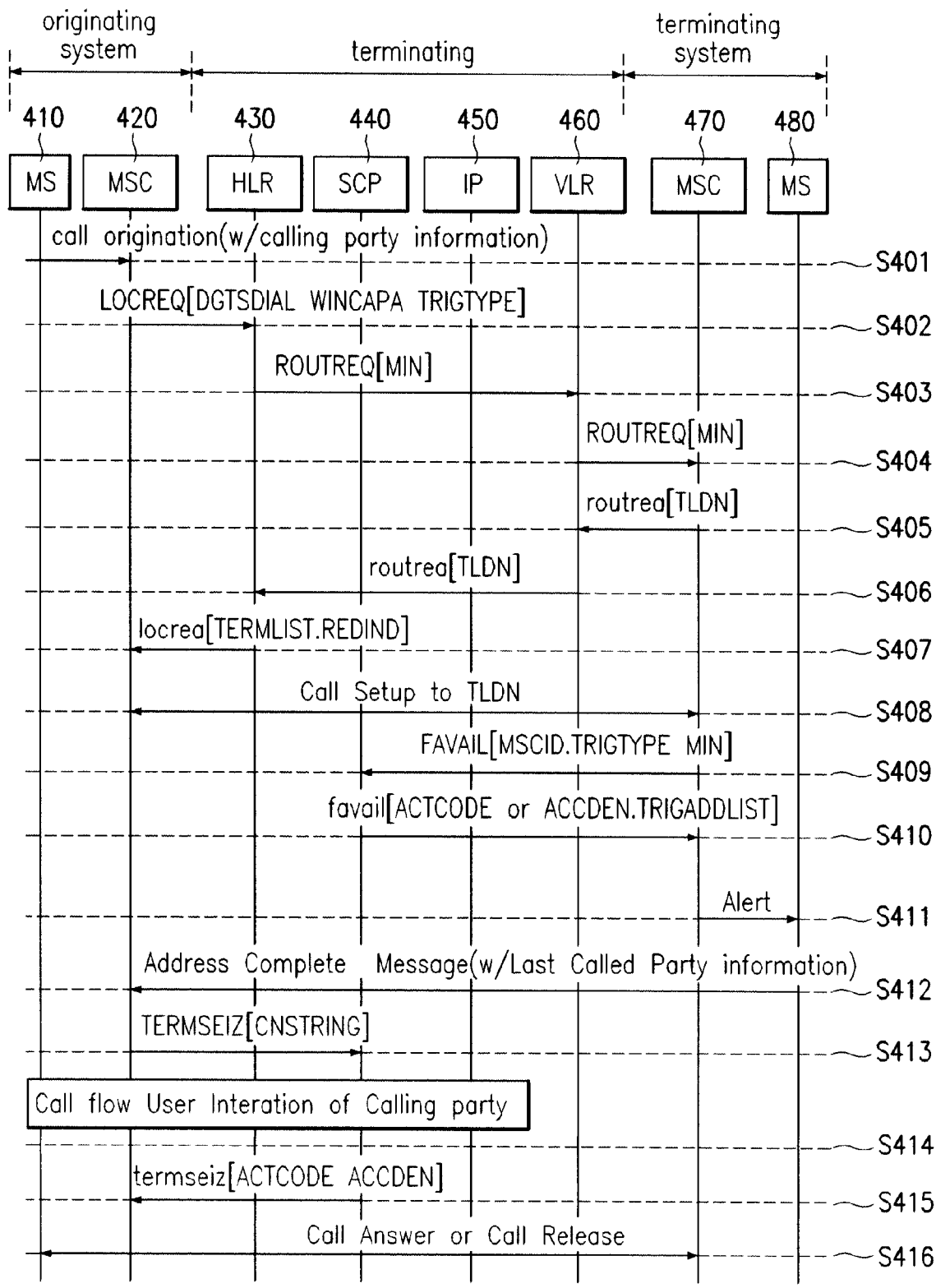

FIG.11

| Analyzed information INVOKE Parameters ||
|---|---|
| field | Value |
| Identifier | SET[NATIONAL 18] |
| Length | Variable octad |
| Contents ||
| BillingID(Originating) ||
| Digits(Dialed) ||
| MSCID(Originating) ||
| TransactionCapability ||
| Triggertype ||
| WinCapability ||
| CallingPartyName ||
| CallingPartyNumberDigits1 ||
| CallingPartyNumberDigits2 ||
| CallingPartySubaddress ||
| LastCalledPartyNumberDigits ||
| LastCalledPartyNumberSubaddress ||
| ConferenceCallingIndicator ||
| EletronicSerialNumber ||
| LocationAreaID ||
| MobileDirectoryNumber ||
| MobileIdentificationNumber ||
| MSCIdentificationNumber ||
| OneTimeFeatureIndicator ||
| PreferredLanguageIndicator ||
| RedirectingNumberDigits ||
| RedirectingPartyName ||
| RedirectingSubaddress ||
| ServingCellID ||
| SystemMyTypeCode ||
| TerminationAccessType ||

FIG.12

| TerminateSeized RETURN RESULT Parameters ||
| field | Value |
| Identifier | SET[NATIONAL 18] |
| Length | Variable octad |
| Contents ||
| AccessDeniedReason ||
| ActionCode ||
| ActionCodeList ||
| AnnouncementList ||
| CarrierDigits ||
| ConferenceCallingIndicator ||
| Digits(Dialed) ||
| DisplayText ||
| DMH_AccountCodeDigits ||
| DMH_AlternateBillingDigits ||
| DMH_BillingDigits ||
| DMH_RedirectionIndicator ||
| NoAnswerTime ||
| OneTimeFeatureIndicator ||
| RedirectingNumberDigits ||
| ResumePIC ||
| RoutingDigits ||
| TerminationList ||
| TerminationTriggers ||
| TriggerAddressList ||

FIG.13

| Trigger detection point | Trigger type |
|---|---|
| Term_Seized DP | Local_Call |
| | Intra_LATA_Toll_Call |
| | Intra_LATA_Toll_Call |
| | Would_Zone_Call |
| | Information_Call |
| | Unrecognized_Number |
| | Prior_Agreement |
| | Specific_Called_Parity_Digit_String |
| | Mobile_Termination |
| | Advanced_Termination |
| | Location |

METHOD OF PERFORMING SERVICE IN MOBILE COMMUNICATION INTELLIGENT NETWORK

BACKGROUND OF THE INVENTION

1. Field of the Invention

The present invention relates to a method of performing a service of a mobile communication intelligent network.

2. Background of the Related Art

Recently, a third generation intelligent network structure to meet the users' wishes is gathering strength in the mobile communication. In the third generation mobile communication, the concept separating the call process and the service performance is introduced so as to implement the specific service, speedily.

In the existing mobile communication network, a home location register (HLR) and a mobile switching center (MSC) are used for processing the call. In the existing mobile intelligent network, a service control point (SCP) and an intelligent peripheral (IP) are used for performing the service. The service control point is the element for controlling the services of the intelligent network and consists of the logics for the service performances. The intelligent peripheral is the network element for utilizing the special resources. For example, a function of the intelligent peripheral includes the function converting the announcement or the characters into the voice, the function converting the voice into the numerical, or the function collecting the information, etc.

One of the related art services using the intelligent network was a calling name presentation (CNAP) service. This calling name presentation displays the identification of the originating subscriber such as the name, the nickname and the company name on the display element of the mobile subscriber. On the other hand, a more convenient and secure service for the user is desired in recent mobile intelligent network.

However, in the related art calling name presentation service, when a call signal is received, the user must identify the identification of the caller from a display device (such as a liquid crystal display) on the telephone set. Accordingly, the related art CNAP service has a problem in that, when another call is received in the middle of a telephone conversation, the user should stop the conversation for a moment for identifying the caller. Therefore, new services to solve these problems have been desired in the mobile intelligent network.

SUMMARY OF THE INVENTION

Accordingly, the present invention is directed to provide a method of performing a calling information audio presentation service which is obtained by adding an audio service with the existing calling name presentation service in a mobile communication intelligent network system.

Another object of the present invention is to provide a method of performing the calling name presentation service of the mobile communication intelligent network offering a more convenient and secure service to the users.

Another object of the present invention is to provide a method of performing the calling name presentation service of the mobile communication intelligent network in which the identification of the originating subscriber can be verified by the terminating subscriber and the identification of the subscriber practically accepting the call can be verified by the originating subscriber.

To achieve these and other advantages and in accordance with the purpose of the present invention, as embodied and broadly described, when the originating subscriber requests a call, the identification of the originating subscriber is immediately announced by the terminating subscriber in a voice. The terminating subscriber can provide the answering information to the call by responding to the audio service. According to the service procedure, the identifications of the audio service subscribers and the identifications of the originating subscribers anticipated for the subscriber are stored in the service control point. Therefore, if the call is requested by the originating mobile subscriber, the terminating mobile subscriber is searched through the home location register and the call is announced to the terminating mobile subscriber through the mobile switching center of the terminating subscriber. When an answer to the call is transmitted from the terminating mobile subscriber, the audio service of the service control point is requested by the mobile switching center of the terminating subscriber.

In response to the request, the service control point searches the identification of the originating mobile subscriber and sends the searched identification together with the announcement broadcast request signal to the intelligent peripheral device. The mobile switching center of the terminating subscriber is connected to the intelligent peripheral device and the intelligent peripheral device announces the identification of the originating mobile subscriber in audio signal to the terminating mobile subscriber.

The originating subscriber can also hear the identification of the terminating subscriber in audio signal through the intelligent peripheral device and the service control point.

As described beforehand, since the identifications of both the originating and terminating mobile subscribers can be announced to both subscribers in audio, the communication is very convenient as well as the subscribers are protected from the wrong or mischievous calls.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 3 is a table showing the set for the encoded SRF directive invoke parameters in FIG. 2;

FIG. 5 is a table showing the encoded parameter set of the signal (TANSWER) of FIG. 4;

FIG. 6 is a table showing the encoded parameter set of the signal (tanswer return result) of FIG. 4;

FIG. 7 is a table showing the wireless intelligent network precedent condition (trigger type) for detection points of the terminating BSCM;

FIG. 10 is a diagram showing the performance of the calling information audio presentation service at the originating subscriber according to the present invention;

FIG. 11 is a table showing the set of the invoke parameters of the signal (TERMSEIZ) of FIG. 10;

FIG. 12 is a table showing the RETURN RESULT parameter sst of the signal (termseiz) of FIG. 10;

FIG. 13 is a table showing the wireless intelligent network condition precedent for terminating the BSCM at the originating subscriber; and, FIG. 14 is a diagram showing the call origination at the originating subscriber.

DETAILED DESCRIPTION OF THE PREFERRED EMBODIMENT

Figure 1:
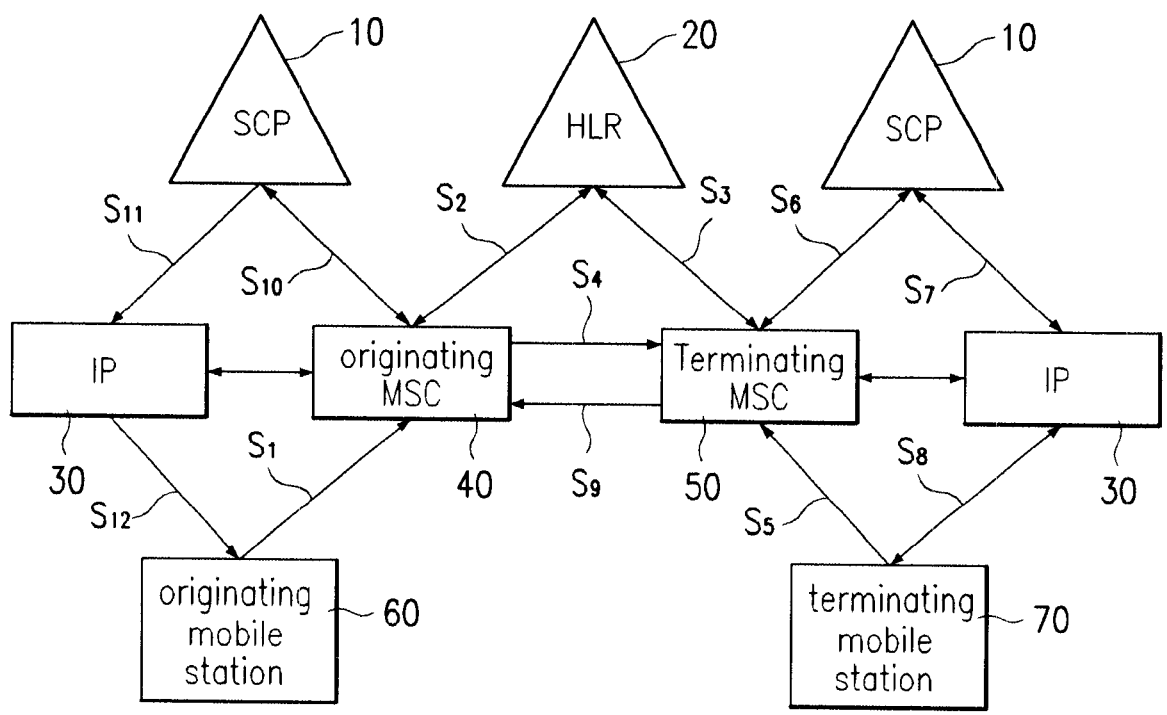
FIG. 1 is a diagram showing the procedure for the calling information audio presentation service according to the present invention for the wireless intelligent network.

Reference will now be made in detail to the preferred embodiments of the present invention, examples of which are illustrated in the accompanying drawings.

As described beforehand, the present invention is called the calling information audio presentation service because the present invention consists of the conventional calling name presentation service and the added audio service. The calling information audio presentation service is also one kind of services of wireless intelligent network. Therefore, the service control point and the intelligent peripherals are also the essential elements of the calling information audio presentation service of the present invention. According to the calling information audio presentation service, the terminating subscriber can hear the identification of the originating subscriber (name, nickname, company name, etc.) before the conversation. Therefore, the terminating subscriber can decide whether or not to receive the call. The terminating subscriber can transfer the corresponding call in the audio post office box. If the terminating subscriber is on a busy line, the calling information audio presentation service can be used more efficiently. In other words, in the case that the call waiting service is in an activated state, if a new call to the subscriber, that is, the terminating subscriber, who is in the busy line is attempted by the other subscriber, the terminating subscriber can be informed of the other call attempted. Therefore, since the identification of the originating subscriber is provided to the terminating subscriber in audio by the calling information audio presentation service before making the connection for the new call, the terminating subscriber can make a decision on the connection with the new call without being connected with the new originating subscriber. The state information (authorization/de-authorization, activation/de-activation) of the calling information audio presentation service is managed by the service control point. On the other hand, since this calling information audio presentation service can hear in audio the identification of the other party at the side of either originating subscriber or terminating subscriber, for the services, some special functions must be provided in the mobile communication intelligent network. The special functions include an announcement function, a text-to-speech conversion function and an information collection function concerned to a speech-to-digit conversion. The announcement function utilizes the language that the subscriber selects for the registration of the calling information audio presentation service. In order to provide the calling information audio presentation service, some preliminary conditions except the items described above exist. First, the terminating subscriber must be registered to utilize the calling information audio presentation service. The authorization and the de-authorization of the calling name presentation service are possible by the customer center equipped with a customer system/billing system or by the network operator equipped with a man machine interface. Furthermore, the activation/deactivation of the calling information audio presentation service is possible for all mobile subscribers, wire-line phones and Internet which can utilize the activation/de-activation procedure (for example, a feature request, remote feature control, etc.) as well as the network operator and the customer center. For example, in order to activate the service, the subscriber of the calling information audio presentation service presses the *FC button and the SEND button in succession. In order to deactivate the service, the subscriber presses the *FCO button and the SEND button in succession. The FC means the feature code. On the other hand, the calling information audio presentation service is invoked only when the service is in activation and at the same time the call is requested for the terminating mobile subscriber. If the calling information audio presentation service is not registered for the subscriber, the corresponding service control point connects the call to the terminating subscriber by successively processing the call. Second, the identification of the originating subscriber must be registered in the data base of the service control point. Third, the number or identification of the really connected terminal must be transferred to the originating subscriber. Fourth, the function informing in audio the terminating subscriber of the identification or number of the originating subscriber and the function informing in audio the originating subscriber of the identification or number of the terminating subscriber must be provided. The CIAP service can only be provided for the case that the terminating subscriber is sure to response, that is, a flip-flop is opened or a special button is pressed.

The calling information audio presentation service according to the present invention in a wireless intelligent network is explained as follows. FIG. 1 is a diagram showing the procedure of the calling information audio presentation service in the wireless intelligent network.

Referring to FIG. 1, the wireless intelligent network consists of the service control point (SCP), the home location register (HLR) 20, the intelligent peripheral (IP) 30, the originating mobile switching center (MSC) 40, the terminating mobile switching center 50, the originating mobile station 60 and the terminating mobile station 70.

In FIG. 1, the steps S1 to S4 indicates the common service procedures, the steps S5 to S8 indicates the terminating service procedures and the steps S9 to S12 indicates the originating service procedures.

The procedure of FIG. 1 includes in five processes.

In first process, the identification of subscribers of the calling information audio presentation service and the identification of anticipated originating subscribers of the subscribers are stored in the data base of the service control point 10 and the language for announcing the intelligent peripherals is selected in the service control point 10.

In second process, if the originating mobile station 60 requests the call through the originating mobile switching center 40, the corresponding terminating mobile station 70 is searched through the home location register 20 and the call is announced to the terminating mobile station 70 through the terminating mobile switching center 50.

In third process, if the terminating mobile station 70 responses to the call, the audio service is requested to the service control point 10 through the terminating mobile switching center 50.

In fourth process, according to the request of the terminating mobile switching center 50, the service control point 10 searches the identification of the terminating subscriber in its data base and sends the identification as well as the announcement request to the intelligent peripheral 30.

In fifth process, the terminating mobile switching center 50 is connected to the intelligent peripheral 30 and the announcement corresponding to the identification of the originating subscriber is transmitted to the terminating mobile station 70 through the intelligent peripheral 30.

On the other hand, the fourth process of the originating subscriber can be added at the end of the fifth process.

In first process, as described beforehand, when the response message to the call from the terminating mobile station 70 is received by the terminating mobile switching center 50, the terminating mobile switching center 50 sends an ACM(Address Completion Message) of ISUP(ISDN user part) with the number of the terminating mobile station 70 to the originating mobile switching center 40.

In second process, the originating mobile switching center 40 responds to the call completion signal and the number of the terminating mobile station 70 that is received by the originating mobile switching center 40 and then sends the number and the message requesting the audio service to the service control point 10.

In third process, the service control point 10 searches the identification corresponding to the number of the terminating mobile switching center 40 that is received by the service control point 10 and sends the searched identification of the terminating subscriber together with the announcement request message to the intelligent peripheral 30.

In fourth process, the identification of the received terminating mobile subscriber is announced to the originating mobile station 60 through the intelligent peripheral 30. The procedure of the calling information audio presentation service is explained in detail.

First, the common calling name presentation service procedure of both the originating subscriber and the terminating subscriber is explained. If a call from the originating mobile station 60 to the terminating mobile station 70 originates through the terminating mobile switching center 40 (S1), the originating mobile switching center 40 sends the location request signal for the terminating mobile station 70 corresponding to the home location register 20 (S2). The home location register 20 sends a routing request signal to the corresponding terminating mobile switching center 50 (S3). It means that a call of the terminating mobile switching center 50 is requested. On the other hand, the originating mobile switching center 40 sends the call set up request signal to the terminating mobile switching center 50.

The terminating calling information audio presentation service is explained as follows.

First, the terminal mobile switching center 50 pages the terminating mobile station 70 and announces the corresponding call request. If the terminal mobile switching center 50 receives the call answer from the terminating mobile station 70 (S5), the message of the calling name audio service request is sent to the service control point 10 (S6).

The service control point 10 receiving the message decides whether the calling information audio presentation service of the terminating mobile station 70 is in activation. If the calling information audio presentation service of the terminating mobile station 70 is in activation, the identification of the originating station 60 and the message corresponding to the requested audio service are sent to the intelligent peripheral 30 (S7). As described beforehand, the identification of the originating subscriber provided when the corresponding terminating subscriber registers has been already stored in the database of the service control point 10 and the language selected when the terminating station 70 registers for the calling information audio presentation service has been also stored in the intelligent peripheral 30. On the other hand, the intelligent peripheral 30 is connected to the terminating mobile switching center 50 and the terminating mobile station 70 can hear the announcement including the identification of the originating subscriber through intelligent peripheral 30. At this time, the terminating mobile station 70 can hear the announcement by the language which is selected for the calling information audio presentation service registration. The terminating mobile station 70 decides how to process the call after hearing the announcement and provides the information to the intelligent point 30. In this process, the intelligent peripheral 30 executes the announcement function, the text-to-speech conversion function and the information collection function, and provides the information received from the terminating mobile station 70 to the service control point 10 (S8). When the intelligent peripheral 30 collects one or more information from the terminating mobile station 70, for example, one or more of a call connection, a call disconnection, a call forwarded to VMS and a forwarding number is collected, the announcement and the information collection steps are repeated as many times as the number of the collected information.

On the other hand, the service control point 10 proceeds the corresponding call by using the information received from the intelligent peripheral 30.

The procedure of the calling information audio presentation service at the originating subscriber is explained as follows.

In this procedure, the language for the announcement function has been previously stored in the intelligent peripheral 30. First, if the terminating mobile switching center 50 receives the call answer message from the terminating mobile station 70, the terminating mobile switching center 50 sends the completion signal to inform the originating mobile switching center 40 of the completion of the call (S9). At this time, the terminating mobile switching center 50 provides the number of the terminating mobile station 70 to the originating mobile switching center 40. The originating mobile switching center 40 sends the service control point 10 the number of the terminating mobile subscriber together with the called ID audio service request signal requesting the audio service for the identification of the terminating subscriber (S10). The service control point 10 responds to the number of the terminating mobile subscriber and the message and then searches the identification corresponding to the number of the terminating mobile subscriber in the name data base and then sends the intelligent peripheral 30 the searched identification together with the instruction of play announcement (S11). Finally, the intelligent peripheral 30 is connected to the originating mobile switching center 40 and executes the announcement function to the originating mobile station 60 by using the identification from the service control point 10 (S12).

Figure 2:
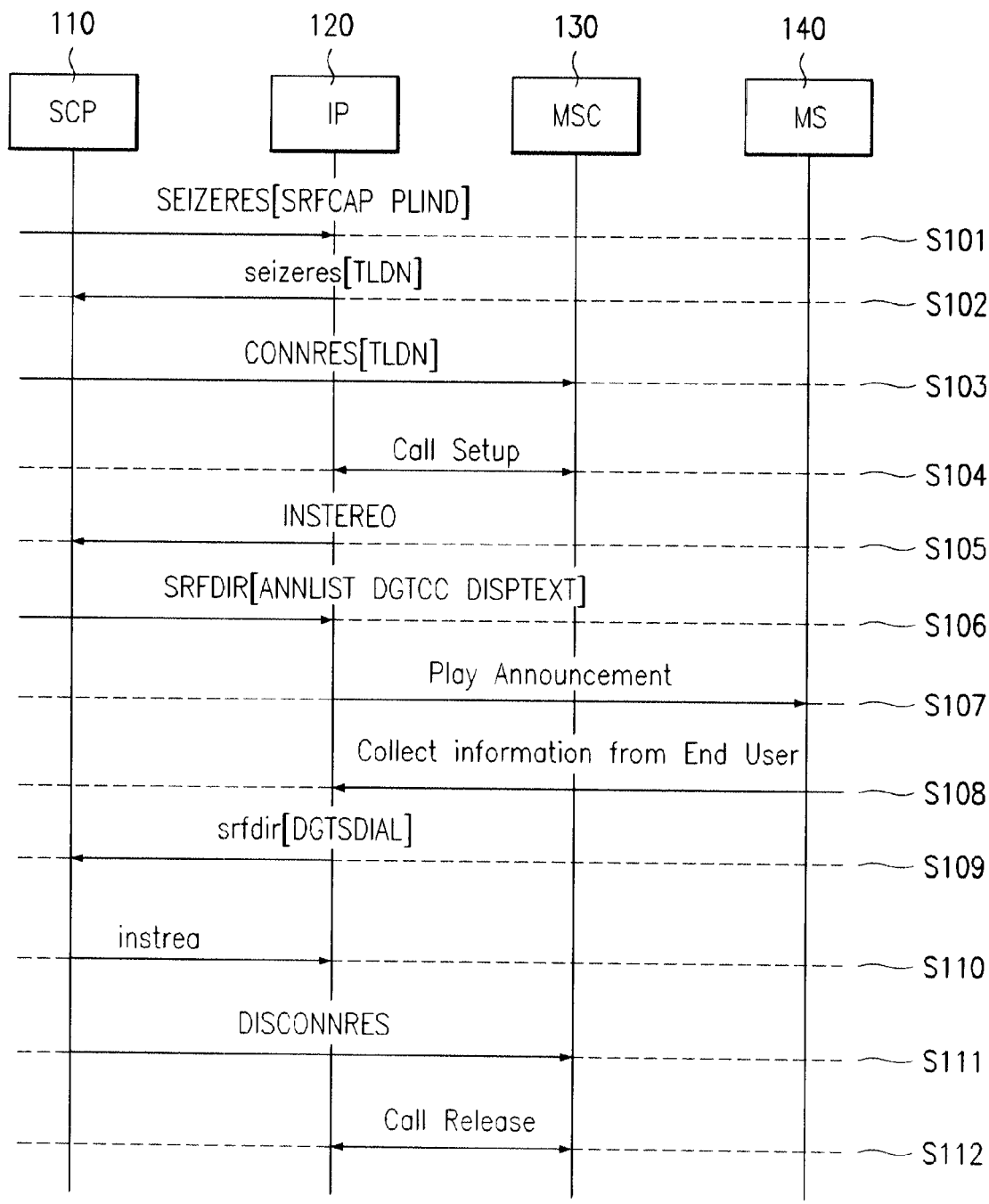
FIG. 2 is a diagram showing the flow chart for the user interaction.

FIG. 2 is a diagram showing the call flow for the interaction between the terminating subscribers.

In FIG. 2, the numeral 110 denotes the service control point, the numeral 120 denotes the intelligent peripheral, the numeral 130 denotes the mobile switching center, and the numeral 140 denotes the mobile subscriber.

Referring to FIG. 2, the service control point 110 checks the service state for the subscriber and sends the seize resource signal (SEIZERES[SRFCAP PLIND]) to the intelligent peripheral 120 in order to request specific resources or specific resource sets (S101). The parameter (SRFCAP) in the seize resource signal (SEIZERES) stands for the SRF capability and indicates the capability of the requested resource. The parameter PLIND stands for the preferred language indicator and means that the language is a proper one.

The intelligent peripheral 120 sends the service control point 110 a seize signal seizrers[TLDN] having a temporary location directory number (TLDN) (S102). The service control point 110 receives the TLDN and makes the received TLDN included in a connect resource signal (CONNRES) and sends the mobile switching center 130 the result (S103). The mobile switching center 130 as well as the intelligent peripheral 120 makes the connection to the TLDN assigned to the specific resources. In other words, a call is established between the mobile switching center 130 and the intelligent peripheral 120 (S104). The intelligent peripheral 120 is assigned when receiving the seize resource signal from the service control point 110 and sends the service control point 110 the instruction request signal (INSTREQ) when receiving a call establishment signal of a single TLDN concerned to the specific resources from the mobile switching center 130 (S105). Then, the service control point 110 sends the intelligent peripheral 120 a signal (SRFDIR[ANNCODE, DGTCC. DISPTEXT]) for performing a single specific interaction operation, for example, the announcement reproduction or the digit collection (S106). The digit collection control parameter (DGTCC) indicates the collection of digits. The announcement code parameter (ANNCODE) indicates the announcement for the reproduction or the list of tone. The display text parameter (DISPTEXT) indicates the display of the name of the originating mobile subscriber.

The intelligent peripheral 120 executes the announcement function toward the terminating mobile subscriber 140 by using the name of the originating subscriber in the display text parameter (DISPTEXT) (S107). At this time, the intelligent peripheral 120 executes the text-to-speech conversion function. The intelligent peripheral 120 collects the processing information (for example, digits) about the call from the terminating mobile subscriber (S108). If the number of information collected from the terminating subscribers is one or more, the intelligent peripheral 120 repeatedly performs the announcement and the information collection as many times as the number of information. The intelligent peripheral 120 performs the requested interaction between subscribers and makes the result included in the response signal (srfdir[DGTSDIAL]) of the signal (SRFDIR) and then sends it to the service control point 110 (S109). After then, the service control point 110 sends the intelligent peripheral 120 a signal instreq in order to end the communication between the service control point and the intelligent peripheral (S110). When the service control point 110 concludes the communication between them to be ended, the service control point 110 sends the mobile switching center 130 a signal (DISCONNRES) (S111). Therefore, the mobile switching center 130 releases the connection to the intelligent peripheral 120 and then the corresponding call is released (S112).

The operation of the SRF directive signal (SRFDIR) is explained in detail. This SRF directive operation is used by the service control logic in order to direct the operation of the intelligent peripheral (or the other network capacity) providing the interaction between subscribers. The SRF directive operation starts according to the signal (TCAP invoke). This operation is carried out by the signal (TCAP conversation package) that has no permission.

FIG. 3 is a table showing the set of the encoded SRF directive INVOKE parameters.

In FIG. 3, when one of the announcement list parameter and the digit collection control parameter or the combination of two parameters exists, an execute script parameter is not included. When the execute script parameter exists, the announcement list parameter and the digit collection control parameter do not exist. In other words, one of the two kinds of parameters must be presented.

Figure 4:
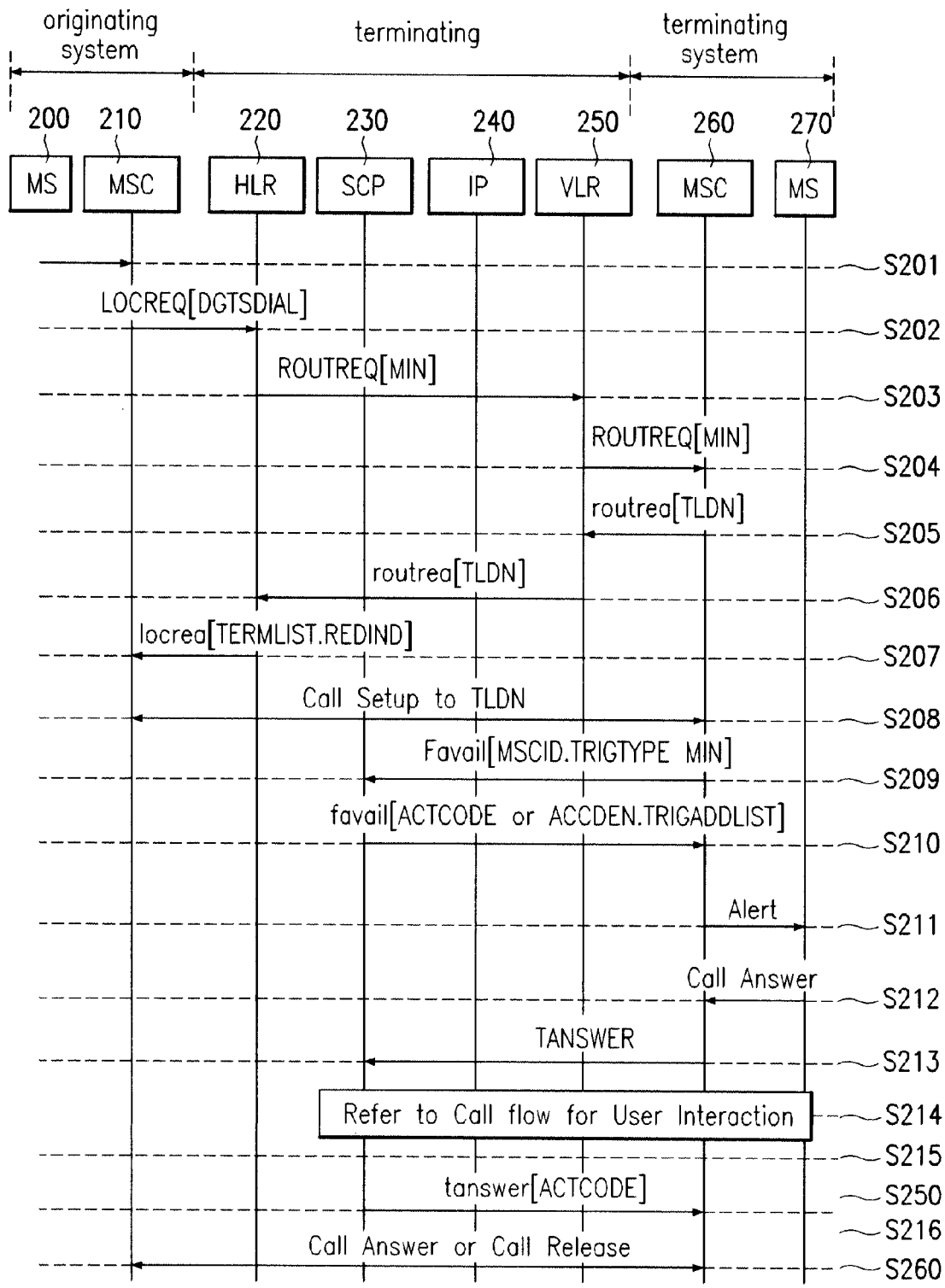
FIG. 4 is a diagram showing the performance of the calling information audio presentation service from the terminating subscriber according to the present invention.

FIG. 4 is a diagram showing the procedure of the calling information audio presentation service at the terminating subscriber according to the present invention. The flow of the calling information audio presentation service is achieved by the service control point based on the service interaction manager (SIM).

In FIG. 4, the numeral 200 indicates the originating mobile station. The numeral 210 indicates the originating mobile switching center. The numeral 220 denotes the home location register (HLR). The numeral 230 denotes the service control point. The numeral 240 denotes the intelligent peripheral. The numeral 250 denotes the visited location register (VLR). The numeral 260 denotes the terminating mobile switching center. The numeral 270 denotes the terminating mobile station.

Referring to FIG. 4, the procedure of the calling information audio presentation service according to the present invention is explained in detail as follows.

First, if the originating mobile station 200 sends the call origination request according to the originating information, the addresses (that is, the directory numbers) for the call origination and the terminating mobile station 270 are received by the originating mobile switching center 210 (S201).

The originating mobile switching center 210 sends the location request signal (LOCREQ[MIN]) to the home location register 220 concerned with the originating mobile station 200 (S202). Concerning with the home location register 220 is achieved by the dialed address digit (which may not be the MIN). When the address digit (or the number digit) of the dialed terminating mobile station are assigned to a legitimate subscriber, the home location register 220 sends a route request signal (ROUTREQ[MIN]) to the visited location register 250 to which the dialed terminating mobile station 270 is registered (S203). The visited location register 250 sends a route request signal (ROUTREQ[MIN]) to the terminating mobile switching center 260 which is now serving (S204). It must be noticed that the mobile station may go around in the area of a visited location register which is now serving and may report its new location to the visited location register through the other mobile switching center which is newly serving. However, the visited location register now in serving may not report the location change to the home location register. The terminating mobile switching center 260 in serving arranges the temporary local directory number (TLDN) and sends the visited location register 250 the information about the TLDN which is combined with the signal (routreq[TLDN]) responding to the signal (ROUTREQ[MIN]) (S205). The visited location register 250 sends the home location register 220 the response signal (routreq[TLDN]) (S206). When the signal (routreq[TLDN]) is received by the home location register 220, the home location register 220 sends the terminating mobile switching center 210 the signal (locreq[TERMLIST REDIND]) which is the response to the location request signal (LOCREQ) (S207). The response signal (locreq) includes the information indicating the reason to expand (for CD) the incoming call from the DMH-redirection indicator parameter (REDIND) and includes the routing information of the type of the termination list parameter (TERMLIST).

The originating mobile switching center 210 establishes the voice path to the terminating mobile switching center 260 now in serving by using the routing information specified for the current interconnection protocol (SS7) and the location request response signal (locreq) (S180). Therefore, the call to the TLDN is set up (S208).

After then, the terminating mobile switching center 260 in serving sends the service control point 230 the signal (FAVAIL[MSCID TRIGTYPE MIN]) in order to inform the service logic that the trigger value in the facility-selected and available DP is satisfied (S209). The signal (FAVAIL [MSCID TRIGTYPE MIN]) includes the information as much as what it is known in the current state of the call that is available for the service logic, for example, MSCID, MIN and TRIGTYPE (S190). The parameter (TRIGTYPE) in the signal (FAVAIL) is presented for the subscriber of the calling information audio presentation service and makes the signal (FAVAIL) reached the service control point 230. If the parameter of the signal is not presented for the subscriber of the calling information audio presentation service, the signal (FAVAIL) goes to an alert state.

The service control point 230 sends the terminating mobile switching center 260 the signal (favail[ACTCODE or ACCDEN TRIGADDLIST]) having the information about additional proceeding of the corresponding call as the response to the signal (FAVAIL) (S210). If the service control point 230 performs successfully the execution message of the signal (FAVAIL), the parameters included in the response signal (favail) may be the action code parameter (ACTCODE) and the trigger address list parameter (TRIGADDLIST). The trigger address list parameter (TRIGADDLIST) includes the parameter (T-ANSWER DP) and the parameter (SCP address). However, if the service control point 230 does not perform successfully the execution message, the trigger address list parameter (TRIGADDLIST) includes the access denied reason parameter (ACCDEN). In other words, the trigger address list parameter (TRIGADDLIST) includes the operation information about processing the call from the terminating mobile station 270. As an example, the signal may include the information to send the service control point 230 the call answer.

The terminating mobile station 270 is alerted (S211).

On the other hand, the terminating switching center 260 receives the call answer signal from the terminating mobile station 270 (S212).

If the call answer signal is received, the terminating mobile switching center 270 sends the service control point 230 the signal (TANSWER) (S213).

Subsequently, the mobile communication intelligent network executes the call flow for the user interaction as shown in FIG. 2 according to the signal (TANSWER). Here, the service control point 230 finally collects the digits by the intelligent peripheral 240 and the terminating mobile switching center 260 (S214).

According to the collected digits, the service control point 230 sends the terminating mobile switching center 260 the signal (tanswer) as the response signal of the signal (TANSWER) together with the action code parameter (ACTCODE) (S215).

Finally, the terminating mobile switching center 260 connects or disconnects the call to the originating subscriber (S216).

The signal (TANSWER) transmitted from the terminating mobile switching center to the service control point and the signal (tanswer) transmitted from the service control point to the terminating mobile switching center as the response to the signal (TANSWER) are explained in detail as follows.

FIG. 5 is a table showing the set of the encoded parameters of the signal (TANSWER) of FIG. 4. The operation of the signal (TANSWER) is used by the terminating mobile switching center to obtain the call processing directive items from the service control point (or SN) and starts by the signal (TCAP INVOKE). This is transmitted by the permitted signal (TCAP QUERY package).

In the table of FIG. 5., the parameter (billing ID(invoking)) includes identifying the call at the terminating mobile switching center in invoking. The parameters (MSCID, MSCI identification number) includes identifying the mobile switching center in invoking. The parameter (Trigger type) includes identifying the faced trigger. The parameter (WIN capability) includes identifying the supported wireless intelligent network capabilities. The parameter (Mobile Directory number) includes the availability for recording. At least one of the parameters (Mobile Directory numbers) must be presented for the usage as a service key. The parameter (One Time Feature Indicator) includes setting some one time feature indicator state bits (for example, if it is one). The undescribed other parameters except the parameters described above include the possibility of utilization (for example, if they are provided at the call beginning).

The signal (tanswer) transmitted from the service control point to the terminating mobile switching center as the response to the signal (TANSWER) is explained in detail as follows.

The operation of the signal (tanswer) is reported by the signal (TCAP RETURN RESULT) and carried by the signal (TCAP RESPONSE package).

FIG. 6 is a table showing the encoded parameter set of the signal (Tanswer return result) of FIG. 4.

In FIG. 6, the parameter (access denied reason) includes indicating whether the access is denied. If the parameter includes it, the other selection parameters is not included. However, the parameter (announcement list) is an exception. The parameter (Action code) includes indicating whether the operation to be executed is suggested by the existence of the other parameters. The parameter (Action code) is exclusive to each other. The parameter (Action code list) includes indicating the operation to be taken. The parameter (Action code list) is also exclusive to each other. The parameter (Announcement list) includes indicating whether one or more tones or the announcements is applied to the corresponding mobile station. The parameters (DMH Account code digit, DMH alternate billing digits, DMH billing digits, DMH redirection indicator) includes indicating the possibility of utilization for recording. The parameter (one time feature indicator) includes indicating whether the modification of the normal characteristic is requested for the currently progressing call. The parameter (redirecting number (Termination list) includes indicating whether the call routing is requested.

The parameters (Termination Triggers, Trigger Address List) includes indicating whether it is applicable. The parameters (Calling party number string 1, Calling party number string 2, display text) includes indicating whether the parameter (Local Termination) is included in the parameter (Termination List) and whether the concerned characteristic is in activation. The parameter (Group Information) is included for the multi-leg call.

Triggering in the calling information audio presentation service is explained as follows.

The termination trigger criteria of the call identifies the call termination criteria that requests the clear call process processing. The examples of the criteria are answer, busy, no paging response, no answer, not reachable, routing failure, etc.

FIG. 7 is a table showing the wireless intelligent network trigger precedence condition of the terminating BSCM at the terminating subscriber. FIG. 7 is classified into a trigger detection point and a trigger type. The detailed explanation for the FIG. 7 is omitted.

On the other hand, the mentioned trigger for the signal (Tanswer) is detected by the response of the terminating (or originating) mobile station. This trigger may be also detected at the terminating mobile switching center in serving or terminating.

Figure 8:
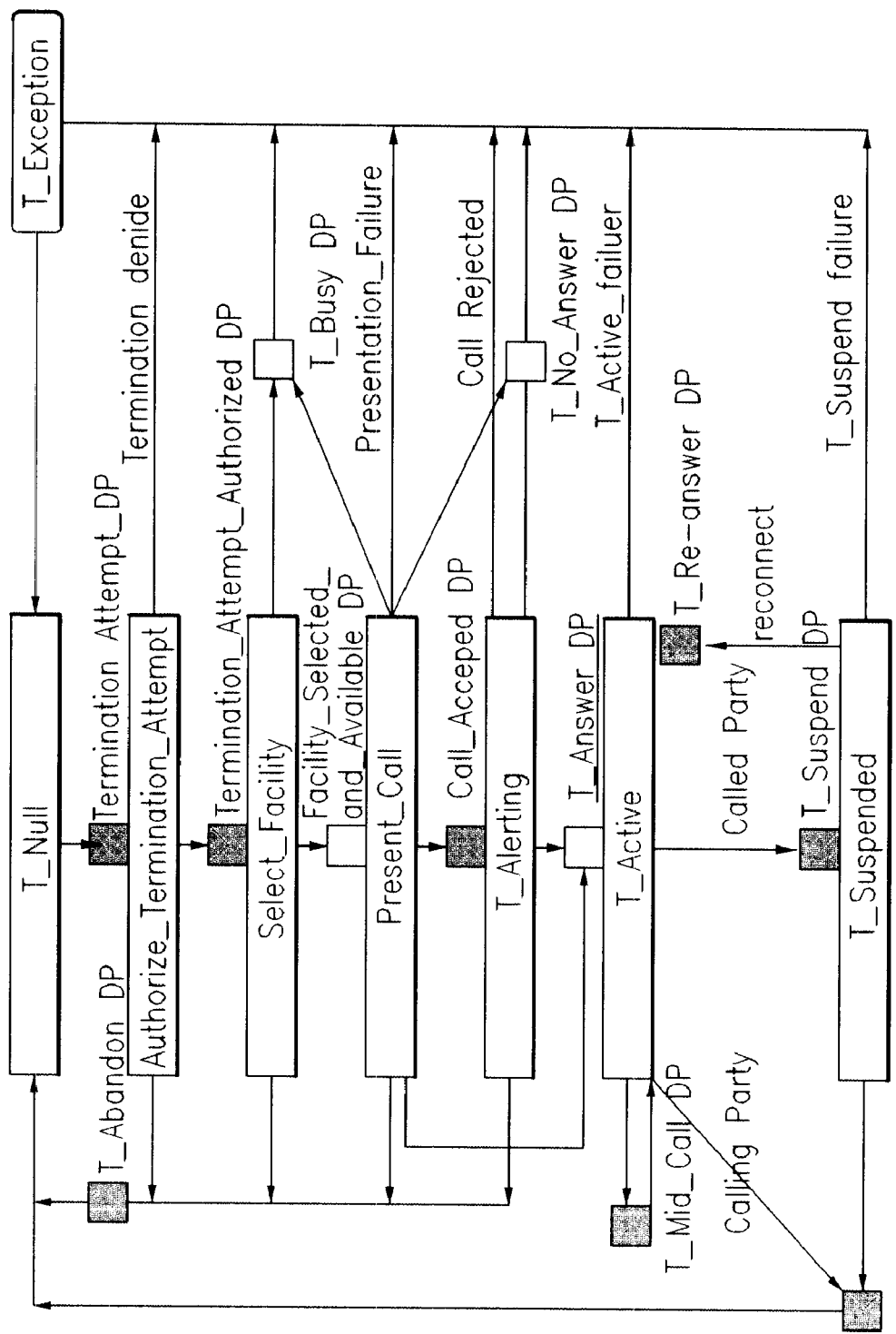
FIG. 8 is a diagram showing the call termination procedure at the terminating subscriber.

FIG. 8 is a diagram showing the call termination procedure at the terminating subscriber. The termination procedure corresponding to a half of the BSCM, as shown in FIG. 8, corresponds to the part of the BSCM concerned with the terminating subscriber. Each PIC(Point In Call) in the end side half of the terminating BSCM is explained in the FIG. 8. In the FIG. 8, the darkened area has no trigger defined for the DP(Detection Point).

The procedure of the calling information audio presentation service is explained as follows.

Figure 9:
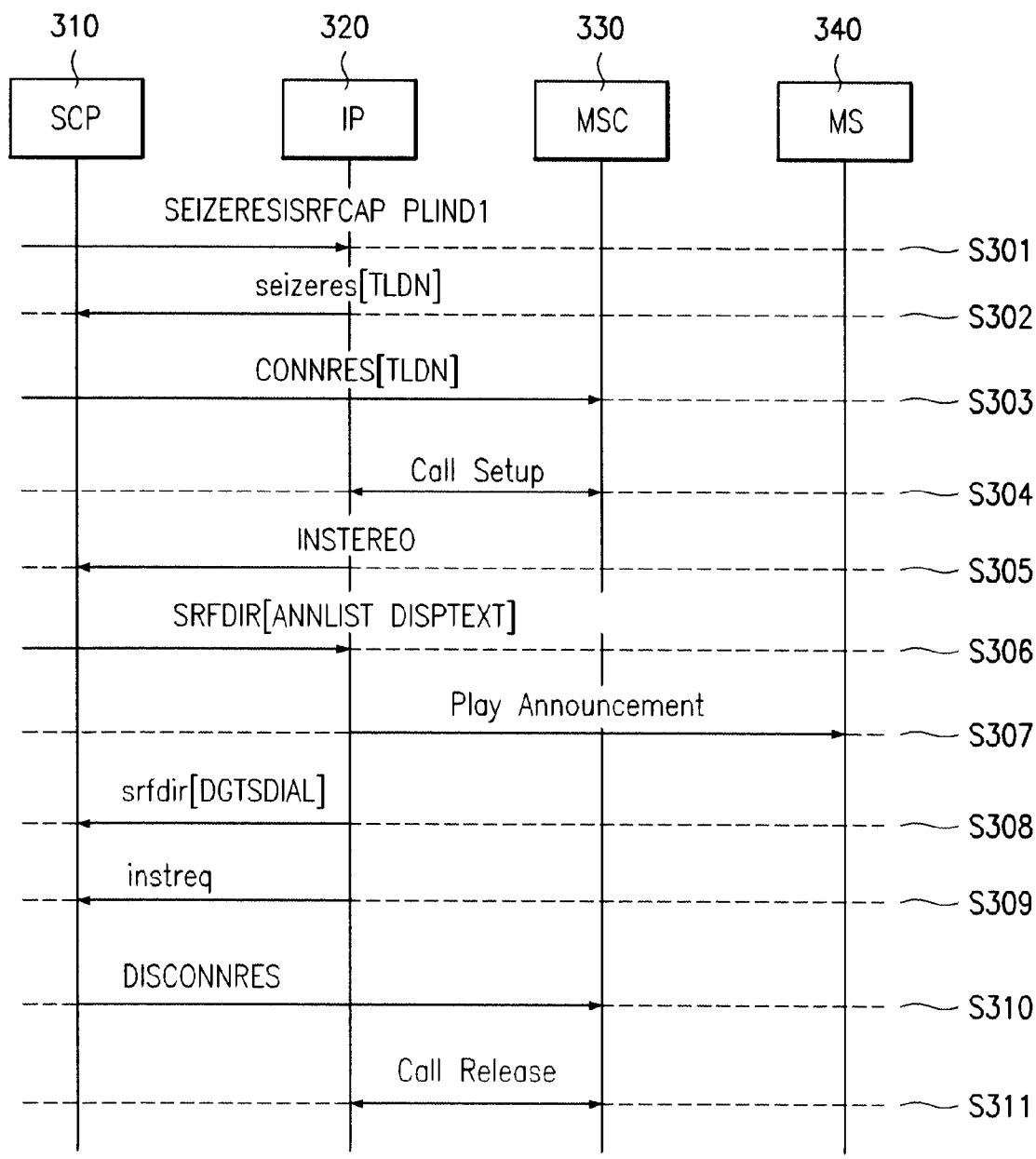
FIG. 9 is a diagram showing the call flow about the interaction of the originating subscribers.

FIG. 9 is a diagram showing the call flow for the interaction of the originating users. As shown in FIG. 9, the interaction of the originating users is proceeded in the same procedure as that of the terminating users except the information collection and the parameter (Display Text). In other words, the originating procedure executes simply the announcement and does not execute the information collection. On the other hand, the information included in the parameter (Display Text) is the identification of the finally terminating user. If the identification of the finally terminating user is not obtained, a terminating number is included in the parameter (Display Text). Therefore, when being announced, the originating subscriber can hear the number instead of the identification of the terminating subscriber.

In FIG. 9, the numeral 310 denotes the service control point. The numeral 320 denotes the intelligent peripheral. The numeral 330 denotes the mobile switching center. The numeral 340 denotes the mobile subscriber.

Referring to FIG. 9, the service control point 310 checks the service state subscribed by the user and sends the intelligent peripheral 320 the seize resource signal (SEIZERES[SRFCAP PLIND]) in order to secure a specific resource or a specific resource set (S301). The parameter (SRFCAP) in the seize resource signal stands for the SRF capability and indicates the capability of the requested resource. The parameter (PLIND) stands for the preferred language indicator and denotes the proper language.

The intelligent peripheral 320 sends the service control point 310 the seize signal (seizeres[TLDN]) having a temporary location directory number (TLDN) for the specific resource (S302). The service control point 320 receives the temporary location directory number from the intelligent peripheral 320 and makes it included in the connect resource signal (CONNRES) and then send the result to the mobile switching center 330 (S303). The mobile switching center 330 makes the connection with the intelligent peripheral 320 and with the temporary location directory number assigned to the specific resource. Therefore, a call is established between the mobile switching center 330 and the intelligent peripheral 320 (S304). The intelligent peripheral 320 is assigned when the seize resource signal (SEIZERES) is received from the service control point 310. When the call establishment signal for a single temporary location directory number concerned with the specific resources is received from the mobile switching center 330, the intelligent peripheral 320 sends the service control point 310 the instruction request signal (INSTREQ) (S305). After then, the service control point 310 sends the intelligent peripheral 320 the signal (SRFDIR[ANNCODE, DISPTEXT]) for executing a single specific interaction operation (for example, the announcement) (S306). The originating side, differently from the terminating side, does not execute the digit collection function. The announcement code parameter (ANNCODE) indicates the list of the tone or of the announcement to be reproduced. The display text parameter (DISPTEXT) includes the identification of the terminating mobile subscriber. When the identification of the terminating subscriber is not obtained, the number of the terminating subscriber is included in the parameter (Display Text).

The intelligent peripheral 320 performs the announcement to the originating mobile station 340 by using the name or number of the terminating subscriber in the display text parameter (DISPTEXT) (S307). The intelligent peripheral 320 performs the text-to-speech conversion function. After performing the announcement function, the intelligent peripheral 320 sends the service control point 310 the signal (srfdir) that is the response to the signal (SRFDIR) (S308). After then, the intelligent peripheral 320 sends the service control point 310 the signal (instreq) in order to terminate the communication between the service control point and the intelligent peripheral (S309). When the interaction between the service control point and the intelligent peripheral is terminated, the service control point 310 sends the mobile switching center 330 the signal (DISCONNRES) (S310). Therefore, the mobile switching center 330 releases the connection to the intelligent peripheral 320 and the corresponding call is also released. (S311).

FIG. 10 is a diagram showing the detailed procedure of the calling information audio presentation service at the originating side according to the present invention. The proceeding flow of the calling information audio presentation service shown in FIG. 10 is completed by using the service control point based on the service interaction manager (SIM). In FIG. 10, the numeral 410 denotes the originating mobile subscriber. The numeral 420 denotes the originating mobile switching center. The numeral 430 denotes the home location register (HLR). The numeral 440 denotes the service control point. The numeral 450 denotes the intelligent peripheral. The numeral 460 denotes the visited location register (VLR). The numeral 470 denotes the terminating mobile switching center (MSC). The numeral 480 denotes the terminating mobile station. Referring to FIG. 10, the procedure of the calling information audio presentation service at the originating side according to the present invention is explained in detail as follows.

First, if the originating mobile station 410 generates the call origination request according to the originating information, the address (i.e., the directory number) of the call origination and terminating mobile subscriber 480 is received by the originating mobile switching center 420 (S401).

The originating mobile switching center 420 sends the location request signal (LOCREQ[DGTSDIAL, WINCAPA, TRIGTYPE]) to the home location register 430 concerned with the originating mobile station 410 (S402). Being concerned with the home location register 430 is completed by the dialed address digits. If the dialed address digits (or number digits) of the terminating mobile station 480 are assigned to the legitimate subscriber, the home location register 430 sends the route request signal (ROUTREQ[MIN]) to the visited location register 460 to which the dialed terminating mobile station 480 is registered (S403). The visited location register 460 sends the route request signal (ROUTREQ[MIN]) to the terminating mobile switching center 470 now in serving (S404). At this time, it is noticed that the mobile station may go around in the visited location register now in serving and may report its new location through the other mobile switching center in newly serving to the visited location register. However, the visited location register in serving may not report the location change to the home location register. The terminating mobile switching center 480 assigns the temporary local directory number and sends the information about the assignment to the visited location register 460 by combining the information and the signal (routreq[TLDN]) that is the response to the signal (ROUTREQ[MIN]) (S405). The visited location register 460 sends the response signal (routreq[TLDN]) to the home location register 430 (S406). When the signal (routreq[TLDN]) is received by the home location register 430, the home location register 430 sends the originating mobile switching center 420 the signal (locreq [TERMLIST, REDIND, TRIGADDLIST]) that is the response to the location request signal (LOCREQ) (S407). The response signal (locreq) includes the indication of the reason (of CD) to expand the incoming call from DMH-redirection indicator parameter (REDIND) together with the routing information of the termination list parameter (TERMLIST) type. When the calling information audio presentation service of the terminating subscriber is not in activation in the step S407, the parameter (TRIGADDLIST) of the signal (locreq) includes the addresses of the service control point and the O-Term-Seized DP.

The originating mobile switching center 420 establishes a voice path to the terminating mobile switching center 470 by using the routing information specified in the current interconnection protocol SS7 and in the location request response signal (locreq). Therefore, a call to the temporary local display number is set up (S408).

After then, the terminating mobile switching center 470 sends the signal (FAVAIL[MSCID TRIGTYPE MIN]) to the service control point 440 to inform the service logic that the trigger value in the facility-selected and available DP is satisfied (S409). The signal (FAVAIL[MSCID TRIGTYPE MIN])includes the information (for example, MSCID, MIN, TRIGTYPE) as much as what it is known under the current state of the call that is available for the service logic. The parameter (TRIGTYPE) in the signal (FAVAIL) is presented for the real subscriber of the calling information audio presentation service and makes the signal (FAVAIL) reached the service control point 440. If there in no real subscriber of the calling information audio presentation service, the signal (FAVAIL) goes to an alert state.

The service control point 440 sends the terminating mobile switching center 470 the signal (favail[ACTCODE or ACCDEN TRIGADDLIST]) having the information about the additional process of the corresponding call as the response to the signal (FAVAIL) (S410). If the service control point 440 successfully performs the execution message of the signal (FAVAIL), the parameters included in the response signal (favail) may be the action code parameter (ACTCODE) and the trigger address list parameter (TRIGADDLIST). The trigger address list parameter (TRIGADDLIST) includes the parameter (T-ANSWER DP) and the parameter (SCP address). However, if the service control point 440 does not successfully perform the execution message of the signal (FAVAIL), the trigger address list parameter (TRIGADDLIST) includes the access denied reason parameter (ACCDEN). In other words, the trigger address list parameter (TRIGADDLIST) includes the operation information about the call process from the terminating mobile station 480. As an example, the information as sending the call response to the service control point 440 may be included. The terminating mobile station 480 is alerted by the terminating mobile switching center 470. (S411).

The terminating mobile switching center 470 sends the originating mobile switching center 420 the real terminating number together with the ACM(Address Completion Message) message of ISUP(ISDN user part) (S412). On the other hand, the originating mobile switching center 420 sends the service control point 440 the signal (TERMSEIZ) together with the parameter (LCNSTRING) corresponding to the final terminating number (S413). Then, the procedure for the originating user interaction processing shown in FIG. 9 is executed (S414). The originating mobile switching center 420 receives the instruction signal (termseiz [ACTCODE or ACCDEN]) of the corresponding call from the service control point 440. In most cases, if the originating subscriber is in hold on state, the instruction continuing the corresponding call is received (S415). On the other hand, the terminating mobile switching center 470 receives the control message for the corresponding call from the originating mobile station 410 or the originating mobile switching center 420 and then connects or releases the corresponding call according to the control message (S416).

The signal (TERMSEIZ) transmitted from the originating mobile switching center 420 to the service center point 440 and, as a return result signal for this, the signal (termseiz) transmitted from the service center point 440 to the originating mobile switching center 420 are explained in detail.

FIG. 11 is a table showing the parameter set encoded from the signal (TERMSEIZ) of FIG. 10.

The operation of the signal (Terminate Seized: TERMSEIZ) is used by the originating mobile switching center 420 to inform the service logic network element such as the service control point or the service network that the trigger criterion in the term-seized DP is satisfied. The service logic elements invoke the service or many services. The operation of the signal (TerminateSeize: TERMSEIZ) is started by the signal (TCAP INVOKE). This signal is transmitted by the permitted signal (TCAP QUERY WITH PERMISSION INVOKE).

The parameter (billing ID(originating)) in the table of FIG. 11 includes identifying the call. The parameters (MSCID(originating), Redirecting Party Name) includes identifying the requesting mobile switching center. The parameter (Trigger type) includes identifying the facing trigger. The parameter (WIN capability) includes identifying the supported wireless intelligent network capability. The parameters (calling party name, calling party number digits 1, calling party number digits 2, calling party subaddress, redirecting number digits, redirecting subaddress) include the information about their availability (if they are provided at the call origination). The parameters (last called party number digits, last called party number subaddress) include the information of their availability (if they are provided in the ACM message of the ISUP). The parameter (conference calling indicator) includes indicating the number of the conferees. The parameters (electronic serial number, mobile identification number) includes identifying the originating mobile switching center. The parameters (location area ID, serving cell ID) include the information about the availability that the information of the originating mobile subscriber can be used. The parameter (Mobile Directory number) includes the availability being used for recording. The parameter (MSC identification number) includes the identifying the MSC that initializes the message. The parameter (One Time Feature Indicator) includes setting the one time feature indicator state bits (for example, the value is one). The parameter (Termination Access Type) indicates whether the call includes a specific access situation (for example, the roamer port access).

The signal (termseiz) that is the response to the signal (TERMSEIZ) is explained as follows. The operation achievement of the signal (Terminate seize: TERMSEIZ) is reported by the signal (TCAP RETURN RESULT(LAST)). Then, that is transmitted in a package by the signal (TCAP RESPONSE).

FIG. 12 is a table showing the set of the encoded parameters of the signal (termseiz:Terminate Seized RETURN RESULT) of FIG. 10.

In FIG. 12, the parameter (access denied reason) indicates whether the access is denied. If it includes, the other selection parameters, except the parameter (an announcement list), are not included. The parameter (Action code) indicates whether the operation to be executed is informed by the other parameter. The parameter (Action code) is exclusive to each other. The parameter (Action code list) includes the indication for the actions to be executed. The parameter (Action code list) is also exclusive to each other. The parameter (Announcement list) indicates whether one or more tones or announcements are applicable to the corresponding mobile station. The parameters (DMH-Account code digits, DMH-alternate billing digits, DMH-billing digits, DMH-redirection indicator) indicate whether they are available for recording. The parameter (DMH-redirection indicator) indicates whether the redirection is applicable. The parameter (one time feature indicator) indicates whether the modification on the normal characteristic is required for the ongoing call. The parameters (redirecting number digits, carrier digits, display text, routing digits, termination triggers, trigger address list) indicate whether they are applicable. The parameter (Termination list) indicates whether the routing of the call is requested. The parameter (conference calling indicator) indicates that the ongoing call has been transferred to the conference call. The parameter (digits(dialed) indicates whether the digits remain to be converted by the mobile switching center.

The triggering that is performed during the calling information audio presentation service is explained as follows.

FIG. 13 is a table showing the WIN trigger precedence of the originating BSCM. FIG. 13 is divided into a trigger detection point and a trigger type. The detailed explanation for the FIG. 13 is omitted.

Figure 14:
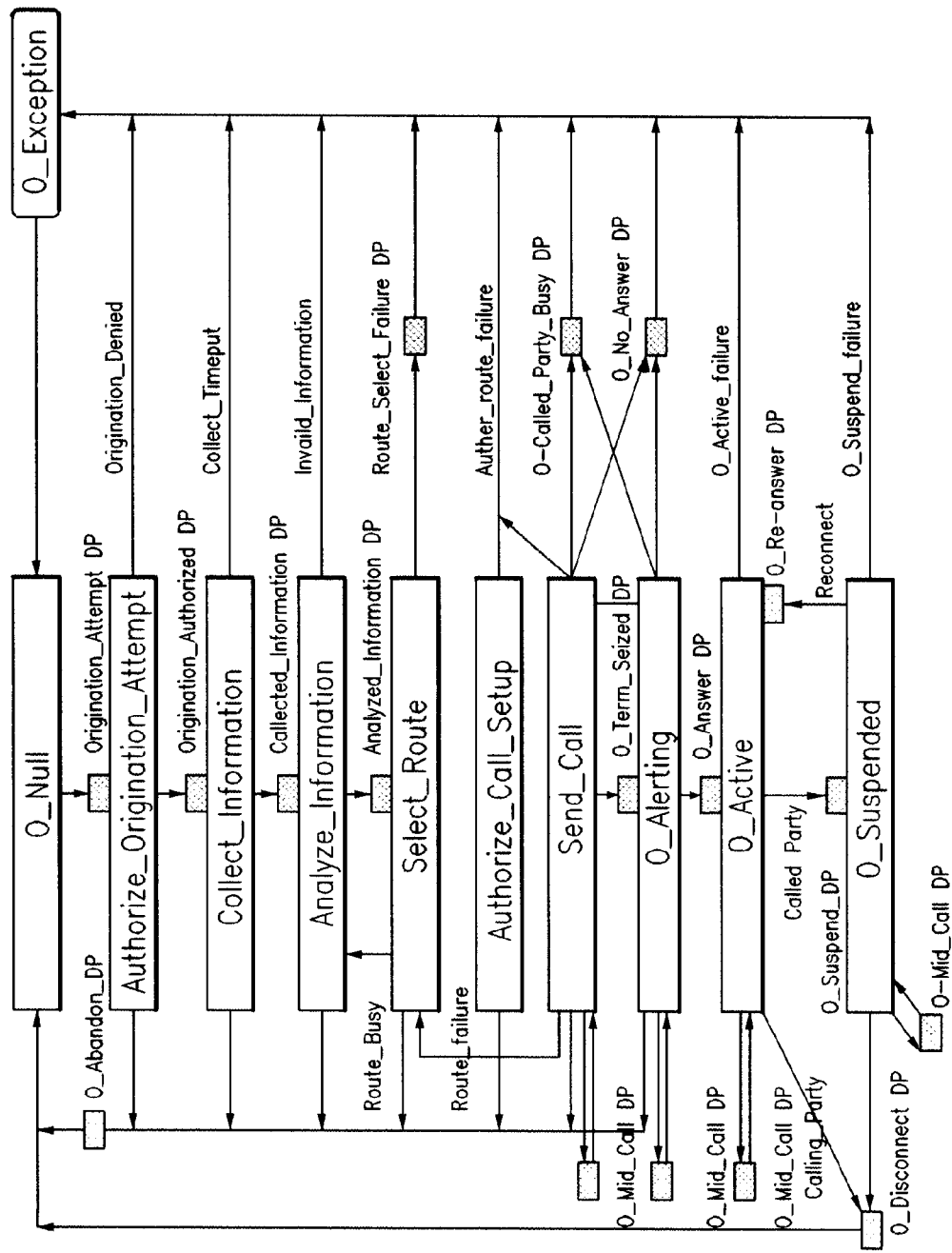

FIG. 14 is a diagram showing the call origination procedure of the originating subscriber. The originating BSCM corresponds to the part concerned with the originating subscriber. In the first half of the BSCM, the explanation for each PIC is in FIG. 14. The darkened part of FIG. 14 is the part in which there is no trigger defined for the DP(Detection Point) in this specification. The O-Term-Seized DP is specified in the wireless intelligent network.

The relationship between the application of the calling information audio presentation service and the other services according to the present invention is explained as follows.

The calling information audio presentation service according to the present invention can be applied to the voice and circuit switched data telecommunication services.

If the services regulating the call (for example, do not disturb, call screening, subscriber, PIN service) are in activation, the calling information audio presentation service is not provided. If the terminating station is busy, the calling information audio presentation service according to the present invention is provided only when the call waiting service is in activation. The originating subscriber whose call waiting service is not in activation is provided with a busy tone according to the existing technique. On the other hand, if the originating subscriber does not want sending his or her own identification to the other party, the originating subscriber can use the existing CNAR(Calling Name Restriction) service. According to the existing CNAR service, the identification of the originating subscriber is not announced to the terminating subscriber.

There are some considerations in the present invention except the facts described beforehand. First, the network configuration is considered. The connection and control methods between the mobile switching center and the intelligent peripheral are different according to the network configuration. Since the network configuration is influenced by the ratio of performance to cost, the network configuration must be carefully considered by the service provider. Second, the handoff must be considered. This service is provided only when a subscriber in a mobile switching center is in an idle state or in a busy state. The following consideration is given to the air interface service. Since this service is given by the network, this service is easily performed if the service control point and intelligent peripheral functions are provided. Finally, the interaction to the other services may be considered according to the call establishment.

According to the calling information audio presentation service of the present invention, the following effects are obtained.

First, since the audio service is provided, the terminating subscriber can identify the identification of the originating subscriber by only hearing before communicating.

Second, since there is a function converting speech signal into digits, the information collection is available. Therefore, there is no need to pick up a receiver and to press buttons.

Third, since the identification of the originating subscriber is sent to the terminating subscriber, the more convenient communication is provided.

Fourth, since the name and number of the real terminating subscriber is reported to the originating subscriber, the more convenient communication is also provided.

Fifth, since a wrong call or a mischievous call can be prohibited, the privacy of the terminating subscriber is protected.

The present invention may be embodied in other specific forms without departing from its spirit or essential characteristics. The described embodiments are to be considered in all respect only as illustrated and not restrictive. The scope of the invention is, therefore, indicated by the appended claims rather than by the foregoing description. All changes which come within the meaning and range of equivalency of the claims are to be embraced within their scope.

What is claimed is:

1. A method of performing a service in a mobile communication intelligent network, comprising:

storing in a service control point an identification of an audio service subscriber and an identification of an anticipated subscriber that is expected to make a call to the audio service subscriber;

when a call is requested by an originating mobile subscriber using an originating mobile station, searching a terminating mobile station of a terminating mobile subscriber through a home location register and informing the terminating mobile station of the call through a terminating mobile switching center;

when said terminating mobile station responds to the call, requesting by the terminating mobile switching center that said service control point perform the service;

in response to said requesting, sending the identification of the originating mobile subscriber stored in said service control point together with an announcement request to an intelligent peripheral of the terminating mobile station through said service control point; and connecting said terminating mobile switching center with said intelligent peripheral and announcing in audio the identification of said originating mobile subscriber to said terminating mobile subscriber through the intelligent peripheral.

2. The method of performing the service in the mobile communication intelligent network claimed in claim 1, further comprising:

specifying a language to use in said intelligent peripheral; and announcing the identification of said originating mobile subscriber to said terminating mobile subscriber by using said language.

3. The method of performing the service in the mobile communication intelligent network claimed in claim 1, wherein said identification includes a name, a number, and a nick name of said originating mobile subscriber.

4. The method of performing the service in the mobile communication intelligent network claimed in claim 1, further comprising:

when a response to the call from said terminating mobile station is received by said terminating switching center, sending a signal informing of the completion of said call together with the number of said terminating mobile station from said terminating mobile switching center to an originating mobile switching center;

sending the number of said terminating mobile station together with the audio service request signal to said service control point through said originating mobile switching center;

sending the identification corresponding to the number of said terminating mobile station together with the audio service request signal from said service control point to said intelligent peripheral; and announcing in audio the identification of said terminating mobile subscriber to said originating mobile subscriber through said intelligent peripheral.

5. The method of performing the service in the mobile communication intelligent network claimed in claim 4, further comprising:

specifying previously a language for the announcement in said intelligent peripheral; and announcing in audio the identification of said terminating mobile subscriber to said originating mobile subscriber through said language.

6. The method of performing the service in the mobile communication intelligent network claimed in claim 4, wherein said identification comprises at least one of name, number, and nickname.

7. A method of performing a service in a mobile communication intelligent network, comprising:

storing an identification of an audio service subscriber and an identification of an anticipated subscriber that is expected to make a call to the audio service subscriber in a service control point;

when an originating mobile station attempts to make a call through an originating mobile switching center, sending a location request signal to a home location register through said originating mobile switching center;

in response to said location request signal, sending a routing request signal from the home location register to a terminating mobile switching center and sending a call establishment request signal from said originating mobile switching center to a terminating mobile switching center;

informing a terminating mobile station of said call through said terminating mobile switching center;

when said terminating mobile switching center receives a response to said call from the terminating mobile station, sending an audio service request signal of the originating mobile station from the terminating mobile switching center to the service control point;

verifying through said service control point whether the audio service of said terminating mobile subscriber is activated;

if the audio service is activated, sending the identification of said originating mobile station stored in the service control point together with the audio service request signal from said service control point to an intelligent peripheral;

performing in audio an announcement to said terminating mobile station by using said intelligent peripheral according to the identification of said originating mobile station and performing information collection about the response to the call from said terminating mobile station;

sending said collected information from said intelligent peripheral to said service control point; and performing a call processing corresponding to said collected information through said service control point.

8. The method of performing the service in the mobile communication intelligent network claimed in claim 7, wherein said intelligent peripheral converts text to speech in response to the audio service request signal from said service control point.

9. The method of performing the service in the mobile communication intelligent network claimed in claim 7, further comprising:

specifying previously a language for the announcement in said intelligent peripheral; and performing said announcement from said intelligent peripheral to said terminating mobile station by using said specified language.

10. The method of performing the service in the mobile communication intelligent network claimed in claim 7, further comprising repeating said announcement and said information collection process as many times as the number of the collected information when said intelligent peripheral collects one or more information in correspondence to said call from said terminating mobile station.

11. The method of performing the service in the mobile communication intelligent network claimed in claim 7, wherein the call processing corresponding to said collected information comprises call connection, call disconnection, call transfer to other peripheral, and number transmission.

12. The method of performing the service in the mobile communication intelligent network claimed in claim 7, further comprising:

when said terminating mobile station sends said terminating mobile switching center the response to said call, sending a call completion signal from said terminating mobile switching center to said originating mobile switching center;

providing the identification of said terminating mobile station from said terminating mobile switching center to said originating mobile switching center;

sending a number of said terminating mobile station together with the audio service request signal from said originating mobile switching center to said service control point;

searching the identification of the terminating mobile station stored in said service control point according to the number of said terminating mobile station and sending said intelligent peripheral the identification together with the audio service request signal; and connecting said intelligent peripheral to said originating mobile switching center and performing the announcement corresponding to the identification of said terminating mobile subscriber to said originating mobile subscriber through said intelligent peripheral.

13. The method of performing the service in the mobile communication intelligent network claimed in claim 12, further comprising:

specifying previously a language for the announcement in said intelligent peripheral; and performing said announcement from said intelligent peripheral to said originating mobile subscriber by using said specified language.

14. The method of performing the service in the mobile communication intelligent network claimed in claim 12, wherein when the announcement to said originating mobile subscriber is performed, said intelligent peripheral converts text to speech.

15. A method of performing a service in a mobile communication intelligent network, comprising:

when an originating mobile station requests a call through an originating mobile switching center, checking the audio service subscribing state of a terminating mobile station by using a service control point;

if said audio service is registered, sending a seize resource signal (SEIZERES) that has a resource capability parameter (SRFCAP) and a specified language indicator parameter (PLIND) and requesting a specific resource from said service control point to an intelligent peripheral;

in response to said seize resource signal (SEIZERES), sending a signal (seizeres) that has a temporary local directory number parameter (TLDN) of the requested specific resource from said intelligent peripheral to said service control point;

sending a connection signal (CONNRES) that includes said temporary local directory number parameter (TLDN) from said service control point to a corresponding terminating mobile switching center;

connecting said terminating mobile switching center with said temporary local directory number in order to establish a call between said mobile switching center and said intelligent peripheral;

when said intelligent peripheral receives said call establishment signal from said terminating mobile switching center, sending an instruction request signal (INSTREQ) from said intelligent peripheral to said service control point;

in response to said instruction request signal (INSTREQ), sending a user interaction signal (SRFDIR) that includes an announcement code parameter (ANNCODE), a digit collection control parameter (DGTCC), and a display text parameter (DISPTEXT) from said service control point to said intelligent peripheral;

performing an announcement to said terminating mobile station by performing a function that converts text to speech by said intelligent peripheral and by using an originating name in said display text parameter;

collecting digits that correspond to the response information about said originating call from said terminating mobile station through said intelligent peripheral;

performing said requested user interaction by said intelligent peripheral and in response to said user interaction signal (SRFDIR), sending said service control point a response signal (srfdir) having a parameter (DGTSDIAL) that includes said collected digits;

in order to terminate the communication between said service control point and said intelligent peripheral, sending a response signal (insreq) in response to said instruction request signal from said service control point to said intelligent peripheral, when an interaction to said intelligent peripheral is completed, sending a disconnection signal (DISCONNRES) to said terminating mobile switching center; and releasing the connection between said terminating mobile station and said intelligent peripheral.

16. The method of performing the service in the mobile communication intelligent network claimed in claim 15, wherein said intelligent peripheral performs the announcement to said terminating mobile station by using the language corresponding to said parameter (PLIND) and by using a tone corresponding to said parameter (ANNCODE).

17. The method of performing the service in the mobile communication intelligent network claimed in claim 15, wherein performing the announcement and the information collection by said intelligent peripheral are repeated as many times as the number of the collected information.

18. The method of performing the service in the mobile communication intelligent network claimed in claim 15, wherein a parameter (Execute script) describing a user interaction is used instead of said announcement code parameter (ANNCODE) and said digit collection control parameter (DGTCC).

19. The method of performing the service in the mobile communication intelligent network claimed in claim 15, further comprising:

before checking the audio service subscribing state of said terminating mobile station, if said originating mobile station having an originating information requests a call origination, receiving the call origination and a number of the terminating mobile station requested by the call through the corresponding originating mobile switching center;

sending a location request signal (LOCREQ) from said originating mobile switching center to the corresponding home location register;

if the digits of the number of said dialed terminating mobile subscriber are assigned to the legitimate subscriber, sending a routing request signal (ROUTREQ) from the home location register to a visited location register to which the dialed terminating mobile station is registered;

sending a routing request signal (ROUTREQ) from the visited location register to the current terminating mobile switching center;

assigning the temporary local directory number (TLDN) through said current terminating mobile switching center;

sending said visited location register the temporary local directory number by attaching said number on the signal (routreq) that is the response to said signal (ROUTREQ);

sending said signal (routreq) from said visited location register to said home location register;

when said signal (routreq) is received by said home location register, sending a signal (locreq) that includes a termination list parameter (TERMLIST) and a redirection indicator parameter (REDIND) in response to said location request signal (LOCREQ) from said home location register to said originating mobile switching center;

establishing a voice path between said originating mobile switching center and said current terminating mobile switching center by using the routing information specified according to said location request signal (locreq);

in order to inform that the trigger value in the facility-selected and available DP is satisfied, sending a signal (FAVAIL) that has many information parameters from said terminating mobile switching center to said service control point;

performing the process corresponding to the information in said signal (FAVAIL) by said service control point and sending the signal (favail) that is responsive to said signal (FAVAIL) and comprising a plurality of information parameters concerned with the additional processing of said call from said service control point to said terminating mobile switching center;

alerting said terminating mobile station;

receiving a call response signal from said terminating mobile station by said terminating mobile switching center; and when said terminating mobile switching center receives said call response signal, sending the signal (TANSWER) that has parameters to perform said user interaction process from said terminating mobile switching center to said service control point.

20. The method of performing the service in the mobile communication intelligent network claimed in claim 19, wherein said signal (FAVAIL) is sent to only the real subscriber of said audio service and includes a parameter (TRIGTYPE) so as to make said signal sent to said service control point.

21. The method of performing the service in the mobile communication intelligent network claimed in claim 19, wherein when said service control point performs successfully the operation according to said signal (FAVAIL), said response signal (favail) includes the action code parameter (ACTCODE) and the trigger address list parameter (TRIGADDLIST) and said parameter (TRIGADDLIST) includes the parameter (T-ANSWER DP) and the parameter (SCP ADDRESS).

22. The method of performing the service in the mobile communication intelligent network claimed in claim 19, wherein when said service control point does not successfully perform the operation according to said signal (FAVAIL), said response signal (favail) includes the action code parameter (ACTCODE) and the trigger address list parameter (TRIGADDLIST) and said parameter (TRIGADDLIST) includes the access denied reason parameter (ACCDEN).

23. The method of performing the service in the mobile communication intelligent network claimed in claim 19, further comprising:

after the communication between said terminating mobile switching center and said intelligent peripheral ends, as a response signal to said signal (TANSWER), sending the signal (tanswer) that has an action code parameter (ACTCODE) according to the digits collected from said terminating mobile subscriber from said service control point to said terminating mobile switching center; and processing the call of the originating mobile subscriber by the terminating mobile switching center according to said signal (tanswer).

24. The method of performing the service in the mobile communication intelligent network claimed in claim 23, wherein processing the call includes a call connection, a call disconnection, a call transfer to the other device and number transmission.

25. The method of performing the service in the mobile communication intelligent network claimed in claim 19, wherein said signal (TANSWER) comprises a parameter (Billing ID) having information to identify the call at the invoking terminating mobile switching center and the parameters (MSCID, MSCI identification number) having information to identify the invoking mobile switching center, a parameter (Trigger type) having information to identify a facing call, a parameter (WIN capability) having information to identify the capability of the supported wireless intelligent network, and a parameter (Mobile Directory number) having information to verify the availability for recording, and wherein the parameter (Directory number) must be presented without exception to be used as the service key and includes a parameter (one time feature indicator) to verify whether the state bits of one time feature indicator are set and a plurality of parameters to verify the availability.

26. The method of performing the service in the mobile communication intelligent network claimed in claim 23, wherein said signal (tanswer) comprises a parameter (access denied reason) indicating whether the access is denied and a parameter (announcement list).

27. The method of performing the service in the mobile communication intelligent network claimed in claim 26, wherein the signal (tanswer) further comprises a parameter (Action code) including information indicating whether the presence of other parameters implies the operation to be executed and is exclusive to each other, a parameter (Action list) that indicates an operation to be taken and is exclusive to each other, a parameter (Announcement list) that indicates whether one or more tones or announcements are applied to the corresponding mobile subscriber, parameters (DMH Account code digit, DMH alternate billing digits, DMH billing digits, DMH redirection indicator) that indicate an availability for recording, a parameter (one time feature indicator) that indicates whether a modification of a normal characteristic is required for the ongoing call, a parameter (redirecting number digits) that indicates whether a direction of the call is changed, a parameter (resume PIC) that indicates a PIC reopening the call processing, a parameter (Termination list) that indicates whether a call routing is requested, parameters (Termination Trigger, Trigger address list) that indicate whether an application is available, parameters (Calling party number string 1, Calling party number string 2, display text) that indicate whether a parameter (Local termination) is included in said parameter (Termination list) and whether a concerned characteristic is activated, and a parameter (Group Information) for a multi-leg call.

28. A method of performing the service in the mobile communication intelligent network comprising:

when a call is requested by an originating mobile station through an originating mobile switching center, verifying the audio service subscribing state of the originating mobile station;

if the audio service is registered, sending a parameter (SEIZERES) that has a resource capability parameter (SRFCAP) and a selected language indicator parameter (PLIND) and that requests a specific resource from said service control point to an intelligent peripheral;

in response to said seize resource signal (SEIZERES), sending a signal (seizeres) that has a temporary local directory number parameter (TLDN) of the specific resource requested from said intelligent peripheral to said service control point;

sending a signal (CONNRES) that includes said temporary local directory number parameter (TLDN) of the specific resource requested from said service control point to a corresponding originating mobile switching center;

in order to establish a call between said originating mobile switching center and said intelligent peripheral, establishing a connection between said originating mobile switching center and said temporary local directory number;

when said intelligent peripheral receives said call establishment signal from said originating mobile switching center, sending the instruction request signal (INSTREQ) from said intelligent peripheral to said service control point;

in response to said instruction request signal (INSTREQ), sending a user interaction signal (SRFDIR) that includes an announcement code parameter (ANNLIST) and a display text parameter (DISPTEXT) with the terminating information from said service control point to said intelligent peripheral;

performing the announcement to said originating mobile station according to the terminating information in said display text parameter (DISPTEXT) by executing the function to convert a text to a speech signal by said intelligent peripheral;

sending said service control point the response signal (srfdir) that is responsive to said user interaction signal (SRFDIR);

in order to terminate the communication between said service control point and said intelligent peripheral, sending a response signal (insreq) from said intelligent peripheral from said service control point to said instruction request signal;

when the interaction between said intelligent peripheral and said service control point is ended, sending a disconnection signal (DISCONNRES) from said service control point to said originating mobile switching center; and releasing the connection between said originating mobile station and said intelligent peripheral.

29. The method of performing the service in the mobile communication intelligent network claimed in claim 28, wherein said parameter (DISPTEXT) includes at least one or a name, a number, and a nickname of the terminating subscriber.

30. The method of performing the service in the mobile communication intelligent network claimed in claim 28, wherein when said intelligent peripheral receives the announcement from said originating mobile station, the announcement function by using the language corresponding to said parameter (PLIND) and by using the tone corresponding to said parameter (ANNLIST) is performed.

31. The method of performing the service in the mobile communication intelligent network claimed in claim 28, further comprising:

before checking the audio service subscribing state of said originating mobile station, requesting the call origination to the corresponding originating mobile switching center according to the originating information of said originating mobile station;

sending a location request signal (LOCREQ) from said originating mobile switching center to the corresponding home location register;

if the number digits of the dialed terminating mobile subscriber is assigned to the legitimate subscriber, sending a routing request signal (ROUTREQ) from the home location register to the visited location register to which the dialed terminating mobile station is registered;

sending the signal (ROUTREQ) from the visited location register to the terminating mobile switching center in currently serving;

assigning the temporary local directory number (TLDN) through the terminating mobile switching center in currently serving;

sending said visited location register the temporary local directory number by attaching said number to a response signal (routreq) that is responsive to said signal (ROUTREQ);

sending the signal (routreq) from said visited location register to said home location register;

when said home location register receives said signal (routreq), sending a signal (locreq) that includes a trigger address list parameter (TRIGADDLIST), a redirection indicator parameter (REDIND), and a termination list parameter (TERMLIST) in response to said location request signal (LOCREQ) from said home location register to said originating mobile switching center;

establishing a voice path between said terminating mobile switching center and said originating mobile switching center by using the specific routing information in said location request response signal (locreq);

in order to inform that the trigger value in the facility-selected and an available DP is satisfied, sending a signal (FAVAIL), comprising a plurality of information parameters from said terminating mobile switching center to said service control point;

performing the process corresponding to the information in said signal (FAVAIL) by said service control point and sending a signal (favail) that is responsive to said signal (FAVAIL) and has many information parameters concerned with the additional processing of said call from said service control point to said terminating mobile switching center;

alerting said terminating mobile subscriber through said terminating mobile switching center;

sending the address completion message together with the identification of the terminating subscriber from said terminating mobile switching center to said originating mobile switching center; and sending a signal (TERMSEIZ) that includes an identification information parameter (LCNSTRING) of the terminating subscriber from said originating mobile switching center to said service control point.

32. The method of performing the service in the mobile communication intelligent network claimed in claim 31, wherein said signal (FAVAIL) is sent to only the real subscriber of said audio service and includes a parameter (TRIGTYPE) so as to make said signal sent to said service control point.

33. The method of performing the service in the mobile communication intelligent network claimed in claim 31, wherein when said service control point performs successfully the operation according to said signal (FAVAIL), said response signal (favail) includes an action code parameter (ACTCODE) and a trigger address list parameter (TRIGADDLIST) and said parameter (TRIGADDLIST) includes O-Term-Seized DP and SCP address.

34. The method of performing the service in the mobile communication intelligent network claimed in claim 31, wherein when said service control point does not successfully perform the operation according to said signal (FAVAIL), said response signal (favail) includes an access denied reason parameter (ACCDEN) and a trigger address list parameter (TRIGADDLIST).

35. The method of performing the service in the mobile communication intelligent network claimed in claim 31, further comprising:
 after the communication between said originating mobile switching center and said intelligent peripheral ends, as a response signal to said signal (TERMSEIZ), sending a signal (termseiz) that has an action code parameter (ACTCODE) or an action denied reason parameter (ACCDEN) from said service control point to said originating mobile switching center; and
 processing the call between said terminating mobile switching center and the originating mobile subscriber according to said signal (termseiz).

36. The method of performing the service in the mobile communication intelligent network claimed in claim 35, wherein processing the call includes at least one of a call connection, a call disconnection, a call transfer to the other device, and number transmission.

37. The method of performing the service in the mobile communication intelligent network claimed in claim 31, wherein said signal (TERMSEIZ) comprises a parameter (billing ID(originating)) that has information to identify the call, parameters (MSCID(originating), Redirecting Party Name) that have information to identify the requesting mobile switching center, a parameter (Trigger type) that includes information to identify a facing trigger, a parameter (WIN capability) that includes information to identify the capability of the supported wireless intelligent network, parameters (calling party name, calling party number digits 1, calling party number digits 2, calling party subaddress, redirecting subaddress) that indicate whether said parameters are available for use if they are provided at the call origination, parameters (last called party number digits, last called party number subaddress) that indicate whether said parameters are available for use if they are provided by the ACM message of ISUP, a parameter (conference calling indicator) that indicates a number of conference attendants, parameters (electronic serial number, mobile identification number) that include information to identify the originating mobile switching center, parameters (location area ID, serving cell ID) that indicate whether information about the originating mobile station is available for use, a parameter (Mobile Directory number) that includes information about the availability for recording, a parameter (MSC identification number) that includes information to identify which mobile switching center initializes the message, a parameter (One Time Feature Indicator) that indicates which state bits of one time feature indicator are set, and a parameter (Termination Access Type) that indicates whether the call is concerned with a specific access situation.

38. The method of performing the service in the mobile communication intelligent network claimed in claim 31, wherein said signal (termseiz) comprises a parameter (access denied reason) that indicates whether access is denied, a parameter (Action code) that includes information indicating whether the presence of other parameters implies the operation to be executed and that is exclusive to each other, a parameter (Action code list) that indicates an operation to be taken and is exclusive to each other, a parameter (Announcement list) that indicates whether one or more tones or announcements are applied to the corresponding mobile station, parameters (DMH-Account code digits, DMH-alternate billing digits, DMH-billing digits) that indicate an availability for recording, parameter (DMH-redirection indicator) that includes the information about the application of redirection and the information about availability for recording, a parameter (one time feature indicator) that indicates whether modification of a normal feature is requested for the ongoing call, parameters (redirecting number digits, carrier digits, display text, routing digits, termination triggers, trigger address list) that include information about the applicability, a parameter (resume PIC) that indicates a PIC resuming the call processing, a parameter (Termination list) indicating whether a call routing is requested, a parameter (conference calling indicator) indicating that the ongoing call is transferred to the conference call, and a parameter (digits(dialed)) indicating whether digits remain to be translated by the mobile switching center.

39. A method of performing service in a mobile communication intelligent network, comprising:
 receiving notification of an originated call from an originating mobile station to a terminating mobile station through a terminating mobile switching center;
 sending a response to the notification of the originated call from the terminating mobile station to the terminating mobile switching center;
 sending a request from the terminating mobile switching center to a service control point to perform a service corresponding to the originated call;
 sending an identification of the originating mobile station and an announcement request from the service control point to an intelligent peripheral of the terminating mobile station;
 connecting the terminating mobile switching center with the intelligent peripheral of the terminating mobile station; and
 audibly announcing the identification of the originating mobile station at the intelligent peripheral of the terminating mobile station.

40. The method of claim 39, wherein the identification of the originating mobile station is stored in the service control point prior to receiving notification of the originated call.

41. The method of claim 39, wherein the identification of the originating mobile station is audibly announced in a prescribed language selected by a user of the terminating mobile station.

42. The method of claim 39, wherein the identification of the originating mobile station comprises at least one of a first name, a telephone number, and a second name of the originating mobile station.

* * * * *